US008464448B2

(12) United States Patent
Palmer (10) Patent No.: US 8,464,448 B2
(45) Date of Patent: Jun. 18, 2013

(54) MOBILE ASSEMBLIES AND METHODS OF USING SAME

(76) Inventor: Scott Palmer, Grantville, GA (US)

( * ) Notice: Subject to any disclaimer, the term of this patent is extended or adjusted under 35 U.S.C. 154(b) by 1444 days.

(21) Appl. No.: 11/465,136

(22) Filed: Aug. 17, 2006

(65) Prior Publication Data

US 2008/0126189 A1    May 29, 2008

(51) Int. Cl.
 *G09F 7/22* (2006.01)
 *A63H 11/00* (2006.01)
(52) U.S. Cl.
 USPC ............................................ 40/617; 446/227
(58) Field of Classification Search
 USPC ............................................ 40/617; 446/227
 See application file for complete search history.

(56) References Cited

U.S. PATENT DOCUMENTS

| 3,117,730 | A | * | 1/1964 | Jones | 362/235 |
|---|---|---|---|---|---|
| 3,564,759 | A | * | 2/1971 | Buttermore | 446/227 |
| 3,683,171 | A | * | 8/1972 | Sclafani | 362/405 |
| 3,978,610 | A | * | 9/1976 | Stubbmann | 446/227 |
| 4,017,991 | A | * | 4/1977 | Berger | 40/440 |
| 4,214,808 | A | * | 7/1980 | Hampson | 359/616 |
| 4,438,727 | A | * | 3/1984 | Thompson | 119/708 |
| 4,567,682 | A | * | 2/1986 | Hurxthal | 40/617 |
| 4,880,197 | A | * | 11/1989 | Wsyzynski | 248/324 |
| 5,606,816 | A | * | 3/1997 | Schwartz | 40/617 |
| 6,068,535 | A | * | 5/2000 | Hoyt | 446/227 |
| D465,932 | S | * | 11/2002 | Henick | D6/302 |
| 6,591,529 | B1 | * | 7/2003 | Lane | 40/617 |
| D554,285 | S | * | 10/2007 | Schuyler | D26/154 |

FOREIGN PATENT DOCUMENTS

| GB | 2348461 A | * | 4/2000 |
|---|---|---|---|
| JP | 2000343897 A | * | 12/2000 |

* cited by examiner

*Primary Examiner* — Casandra Davis
(74) *Attorney, Agent, or Firm* — Brient Intellectual Property Law, LLC (57) ABSTRACT

A mobile comprising one or more: (1) support arm structures (e.g., having one or more elongate arms); (2) charms (e.g., items that are supported by the mobile and that are adapted to provide a desired visual effect); and/or (3) charm attachment members that are adapted to support the mobile's various charms. The mobile may include one or more hanger assemblies for rotatably attaching the mobile (or various individual components of the mobile) to a mobile support or to other components of the mobile. One or more of the hanger assemblies may be adapted to be attached adjacent a plurality of different portions of a particular one of the mobile's support arm structures. This may facilitate adjusting a fulcrum about which the particular support arm structure is supported, allowing the support arm structure to support charms of varying weights and sizes and to, for example, remain in a substantially horizontal orientation while doing so.

3 Claims, 11 Drawing Sheets

MOBILE ASSEMBLIES AND METHODS OF USING SAME

BACKGROUND OF THE INVENTION

In the past, mobiles have been used to display small decorative items, and have typically been somewhat limited in size and functionality. Accordingly, there is a need for new structures and methods for increasing the size, functionality and application of mobiles.

BRIEF SUMMARY OF VARIOUS EMBODIMENTS OF THE INVENTION

A mobile kit according to a particular embodiment of the invention comprises: (1) a support arm structure; (2) a hanger assembly adapted to be to be selectively connected adjacent the support arm structure at any particular one of a plurality of positions along a length of the support arm structure so that the particular position defines a fulcrum about which the support arm structure may rotate; and (3) at least one charm attachment member positioned adjacent the support arm structure and adapted to facilitate the removable attachment of a charm adjacent the support arm structure.

A method of conveying a message according to various embodiments of the invention comprises the steps of: (1) providing a mobile, the mobile comprising a plurality of charm attachment members, the plurality of charm attachment members being disposed within an array, each of the plurality of charm attachment members being adapted to support a respective character display charm on which at least one character is displayed; (2) providing a plurality of character display charms, each of the character display charms including at least one character; and (3) attaching each of the character display charms, respectively, to a respective one of the plurality of charm attachment members so that, once the attaching step is complete, respective characters from each of the plurality of character display charms combine in sequence within the array to form at least one word.

A method of advertising according to particular embodiments of the invention comprises: (1) providing a mobile comprising: (A) a support arm structure; (B) a hanger assembly connected to support the support arm structure; and (C) a plurality of charm attachment members positioned adjacent the support arm structure and adapted to facilitate the removable attachment of a charm adjacent the support arm structure; (2) providing a first set of charms that are each adapted to be removably attached adjacent a respective one of the charm attachment members, the first set of charms cooperating to convey a first advertising message; (3) providing a second set of charms that are each adapted to be removably attached adjacent a respective one of the charm attachment members, the second set of charms cooperating to convey a second advertising message; (4) removably attaching each of the first set of charms adjacent a respective one of the charm attachment members to convey the first advertising message; (5) after the step of removably attaching each of the first set of charms adjacent a respective one of the charm attachment members, detaching each of the first set of charms from adjacent the charm attachment members; and (6) after the step of detaching each of the first set of charms from adjacent the charm attachment members, removably attaching each of the second set of charms adjacent a respective one of the charm attachment members to convey the second advertising message.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Exemplary Mobile Structures
   Overview

A mobile according to various embodiments of the invention comprises: (1) one or more support arm structures (e.g., having one or more elongate arms); (2) one or more charms (e.g., items that are supported by the mobile and that are adapted to provide a desired visual effect); and (3) one or more charm attachment members (e.g., attached adjacent the respective distal ends of the support arm structures) that are adapted to support the mobile's various charms. In particular embodiments, the mobile includes one or more hanger assemblies for rotatably attaching the mobile (or various individual components of the mobile) to a mobile support (e.g., a support cord) or to other components of the mobile. In various embodiments, at least one hanger and at least one charm attachment member are physically integrated into a particular support arm structure. In other embodiments, a support arm structure does not include an integrated hanger and/or a charm attachment member.

Figures 7A, 7B:
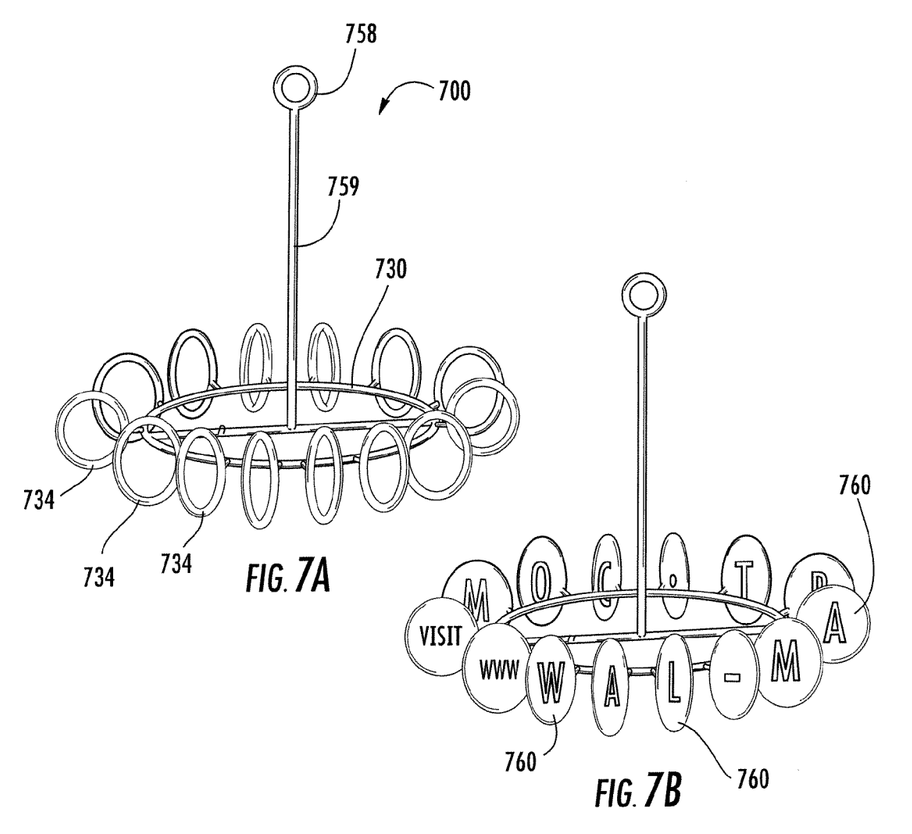
FIG. 7A is a perspective view of an embodiment of a mobile having a plurality of charm attachment members disposed in a substantially circular, substantially horizontal array.
FIG. 7B is a perspective view of an embodiment of a mobile having a plurality of charm attachment members disposed in a substantially circular, substantially horizontal array, and having a plurality of character display charms disposed on each of the plurality of charm attachment members so as to display a message.
Figure 9:
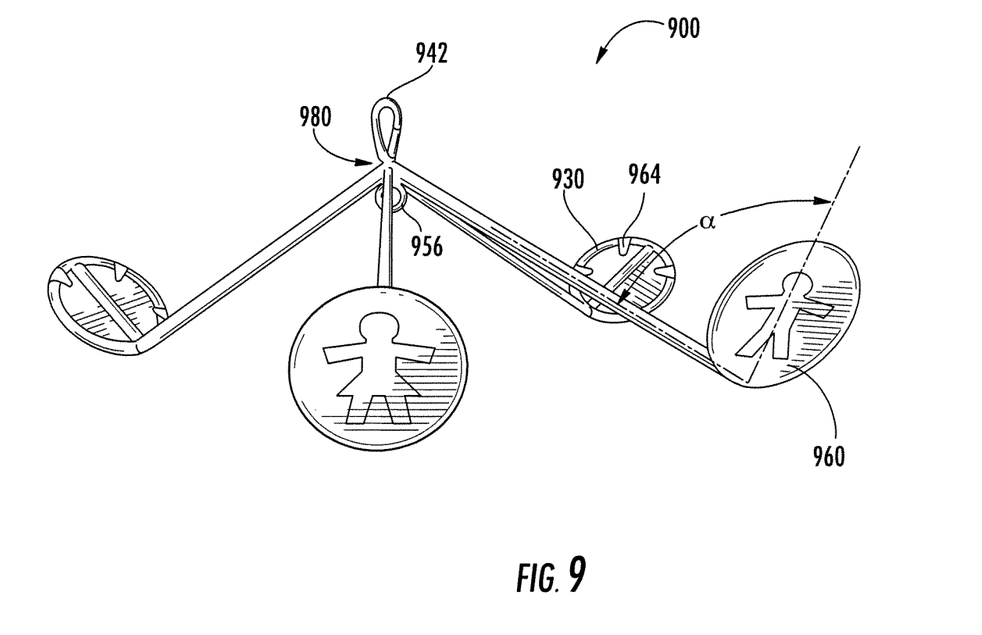
FIG. 9 is a perspective view of a mobile according to particular embodiment of the invention in which the mobile includes a support arm structure having four elongate arms extending outwardly and downwardly from a common hub portion. The elongate arms have charm attachment members disposed on each respective distal end thereof, and each respective charm attachment member is shown supporting a respective character display charm.
Figure 10:
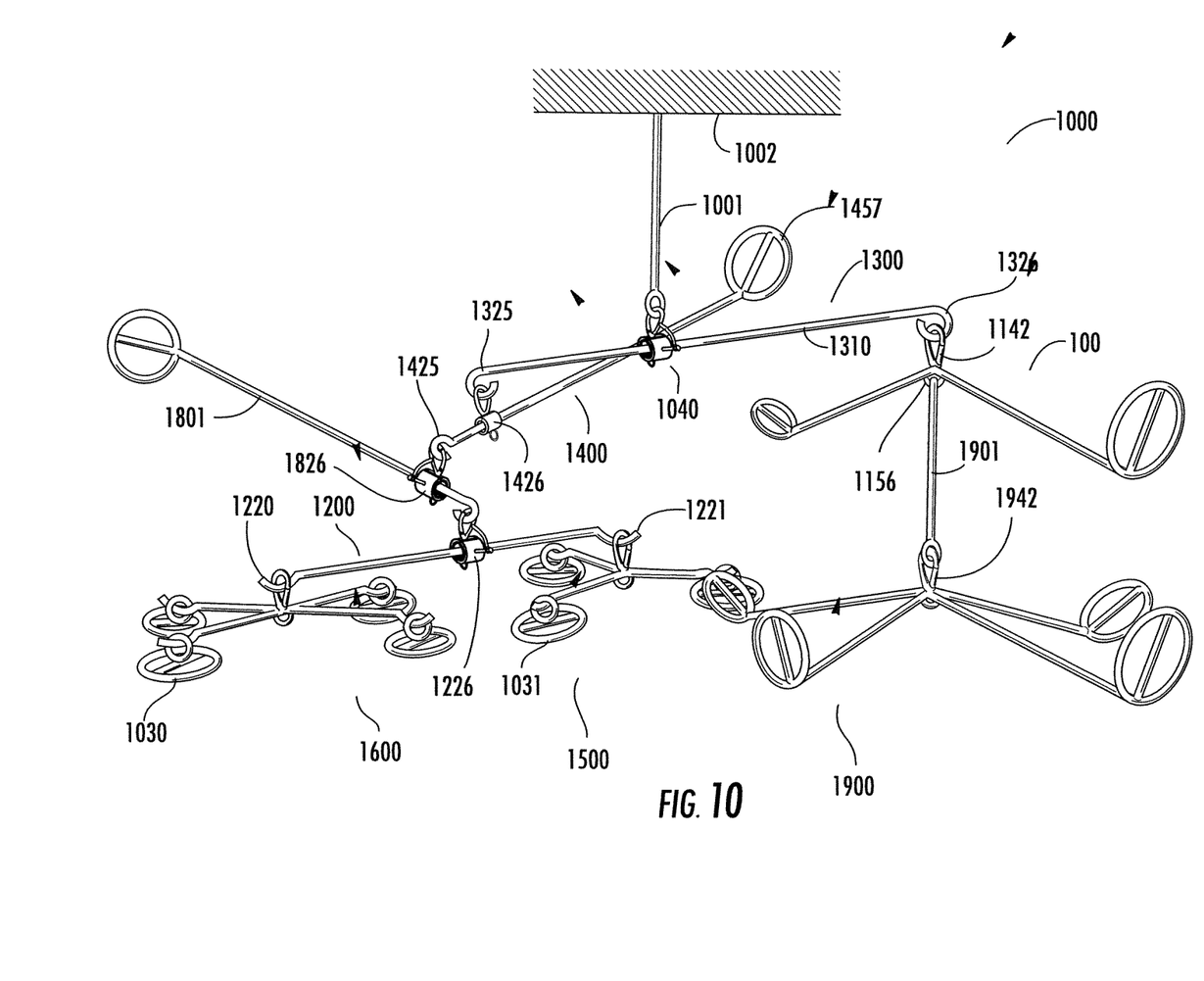
FIG. 10 illustrates a mobile that includes a plurality of support arm structures of varying shapes and sizes.

In particular embodiments, at least one of the hanger assemblies is adapted to be attached at a plurality of different portions along the length of a particular one of the mobile's support arm structures. This may, for example, facilitate adjusting a fulcrum about which the particular support arm structure is supported, which may allow the support arm structure to support charms of varying weights and sizes and to, for example, remain in a substantially horizontal orientation while doing so. FIGS. 7, 9 and 10 depict exemplary mobiles according to various embodiments of the invention.

Exemplary embodiments of the various components of mobiles and mobile kits according to particular embodiments of the invention are discussed in greater detail below.

Support Arm Structures

Support arm structures according to various embodiments of the invention comprise at least one elongate arm that is adapted to support a charm (e.g., adjacent a distal end of the elongate arm). As noted above, in particular embodiments, a support arm structure comprises at least one charm attachment member that is adapted to structurally facilitate attachment of one or more charms adjacent the support arm structure.

Figure 2:
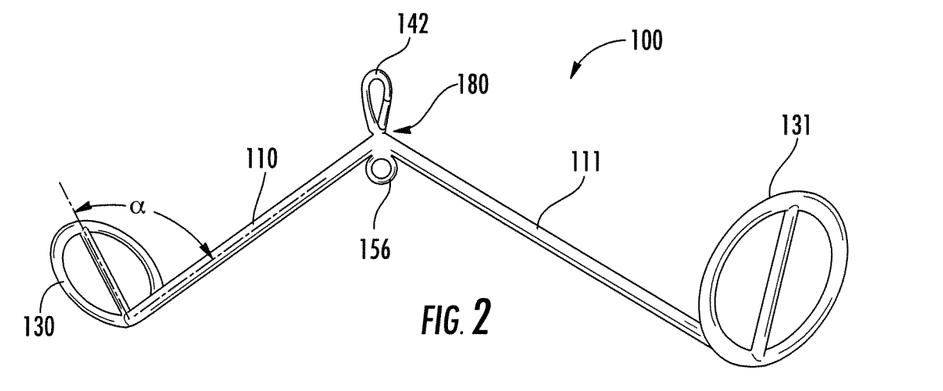
FIG. 2 is a perspective view of a two-arm support arm structure according to a particular embodiment of the invention.
Figure 3A:
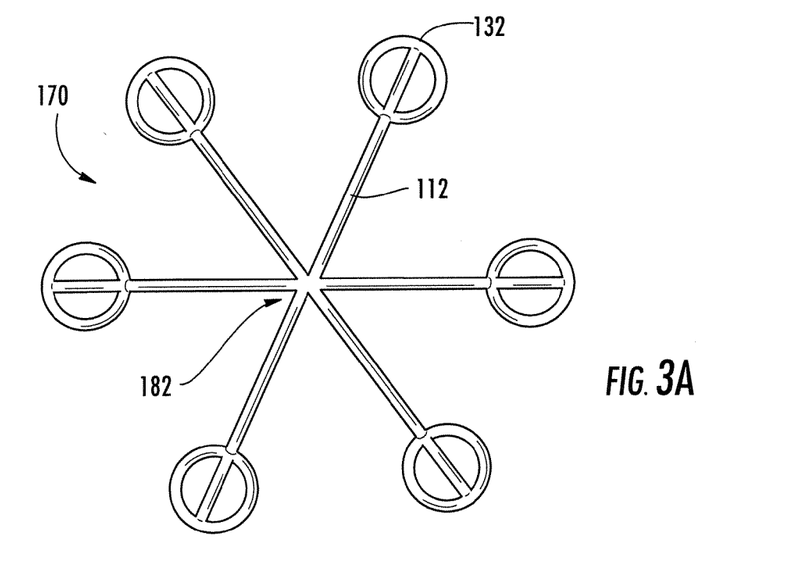
FIG. 3A is a top view of a six-arm support arm structure according to one embodiment of the invention.
Figures 3B, 3C:
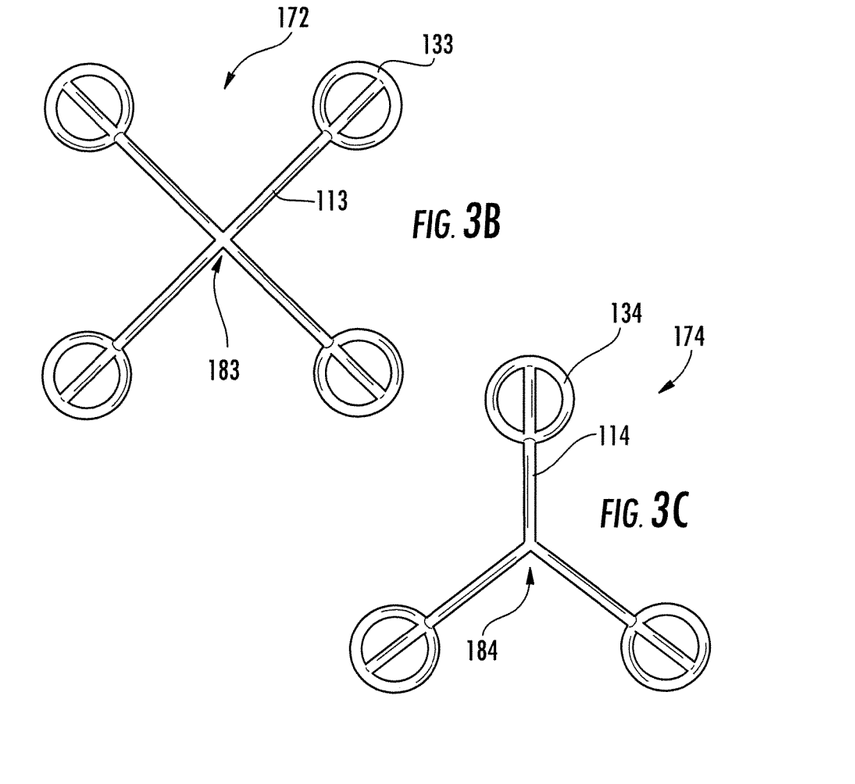
FIG. 3B is a top view of a four-arm support arm structure according to one embodiment of the invention.
FIG. 3C is a top view of a three-arm support arm structure according to one embodiment of the invention.
Figure 4A:
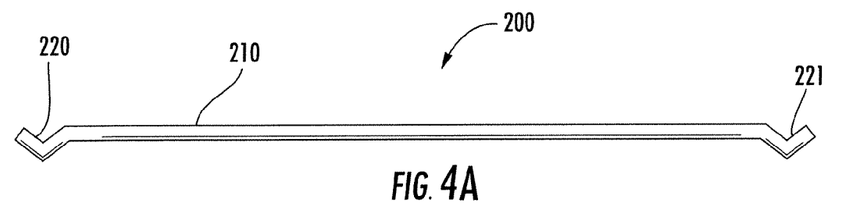
FIG. 4A is a side view of a one-arm support arm structure having a single elongate arm and having a substantially V-shaped charm attachment member disposed adjacent each respective end of the single elongate arm.
Figure 4B:
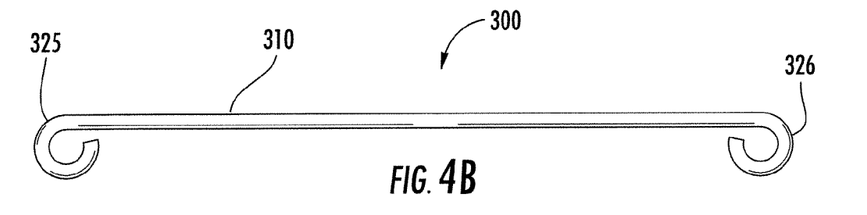
FIG. 4B is a side view of a one-arm support arm structure having a single elongate arm and having a substantially hook-shaped charm attachment member disposed adjacent each respective end of the single elongate arm.
Figure 4C:
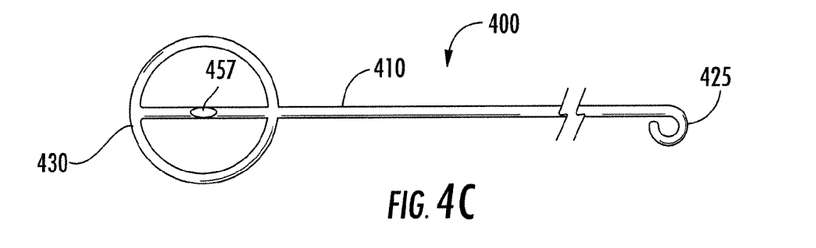
FIG. 4C is a side view of a one-arm support arm structure having a single elongate arm and having a substantially hook-shaped charm attachment member disposed adjacent a first end of the single elongate arm, and a generally circular charm attachment member disposed adjacent a second end of the single elongate arm.

FIGS. 2, 3A-3C, 4A-4C, 9, and 11C illustrate various particular embodiments of a support arm structure of the present invention. As may be understood from FIG. 4A, a support arm structure 200 according to a particular embodiment of the invention comprises a single elongate arm 210 having a substantially V-shaped charm attachment member 220, 221 integrated into each respective one of its distal ends. Similarly, as may be understood from FIG. 4B, a support arm structure 300 according to another embodiment of the invention comprises a single elongate arm 310 having a substantially hook shaped attachment member 325, 326 integrated into each respective one of its distal ends. As shown in FIG. 4C, a support arm structure 400 according to a further embodiment of the invention comprises a single elongate arm 410 having a first type of charm attachment member disposed adjacent its first distal end and a second type of charm attachment member disposed adjacent its second distal end. For example, in the embodiment shown in FIG. 4C, the support arm structure comprises a generally circular charm attachment member 430 adjacent its first distal end and a generally hook-shaped charm attachment member 425 adjacent its second end.

The plurality of support arm structures 200, 300, and 400 illustrated in FIGS. 4A, 4B, and 4C, respectively, illustrate embodiments of a single elongate arm support arm structure. In various other embodiments, a support arm structure can include multiple elongate arms. For example, FIG. 2 illustrates a two-arm support arm structure having a first elongate arm 110 and a second elongate arm 111. The support arm structure shown in FIG. 2 also includes a hub portion 180 adjacent the area at which the first elongate arm 110 and second elongate arm 111 meet. In this embodiment, the first elongate arm 110 and second elongate arm 111 extend generally outwardly and downwardly from the hub portion 180, as shown in FIG. 2, resulting in a V-shaped structure having an apex adjacent the hub portion 180.

In various other embodiments, a particular support arm structure may comprise: (1) a first elongate arm that extends outwardly from a hub portion in a substantially horizontal direction; and (2) a second elongate arm that extends outwardly and downwardly (or, alternatively, outwardly and upwardly) from the hub. Alternatively, these first and second elongate arms can be co-planar (e.g., both extending substantially horizontally from the hub). In other embodiments, a support arm structure may comprise: (1) a first elongate arm that extends outwardly and upwardly from a hub portion; and (2) a second elongate arm that also extends outwardly and upwardly from the hub (e.g., in a direction that is generally opposite to the direction in which the first elongate arm extends from the hub portion).

FIGS. 3A-3C illustrate support arm structures according to various different embodiments of the invention. For example, FIG. 3A illustrates a mobile 170 having a support arm structure that includes six elongate arms (e.g., elongate arm 112)

that each extend outwardly from a hub portion 182. These arms may be spaced substantially radially evenly apart about the hub portion 182 (e.g., the arms may be spaced apart by about 60 degrees about the hub portion 182). In various embodiments, any or all of the six elongate arms 112 may extend generally downwardly, upwardly, or horizontally from the hub portion 182. Thus, the arrangement of the elongate arms can be substantially symmetrical, as shown generally in FIGS. 2 and 9, or can be substantially asymmetrical.

Similarly, FIG. 3B illustrates a mobile 172 having a support arm structure that includes four elongate arms (e.g., elongate arm 113) that each extend outwardly from a hub portion 183. These arms may be spaced substantially radially evenly apart about the hub portion 183 (e.g., the arms may be spaced apart by about 90 degrees about the hub portion 183). In various embodiments, any or all of the four elongate arms 113 may extend generally downwardly, upwardly, or horizontally from the hub portion 183. Thus, the arrangement of the elongate arms can be substantially symmetrical, as shown generally in FIGS. 2 and 9, or can be substantially asymmetrical.

Similarly, FIG. 3C illustrates a mobile 174 having a support arm structure that includes three elongate arms (e.g., elongate arm 114) that each extend outwardly from a hub portion 184. These arms may be spaced substantially radially evenly apart about the hub portion 184 (e.g., the arms may be spaced apart by about 120 degrees about the hub portion 184). In various embodiments, any or all of the three elongate arms 114 may extend generally downwardly, upwardly, or horizontally from the hub portion 184. Thus, the arrangement of the elongate arms can be substantially symmetrical, as shown generally in FIGS. 2 and 9, or can be substantially asymmetrical.

In other particular embodiments, a support arm structure may comprise at least one telescoping elongate arm (and preferably a plurality of telescoping elongate arms) that extends telescopically to selectively allow the at least one elongate arm to be any of a plurality of different lengths. This may, for example, facilitate changing the position of a fulcrum about which the support arm structure is supported, which may allow the support arm structure to support charms of varying weights and to, for example, remain in a substantially horizontal orientation while doing so.

Charm Attachment Members

As noted above, charm attachment members according to various embodiments of the invention are adapted to structurally facilitate attachment of one or more charms (in various embodiments, only one charm) adjacent the support arm structure. In various embodiments, one or more of these charm attachment members may be physically integrated into a particular support arm structure (e.g., the charm attachment member may be part of the support arm structure). However, in particular embodiments, one or more charm attachment members may be physically distinct from a support arm structure to which the charm attachment member is adapted to be attached. In various such embodiments, the charm attachment member may be adapted for selective removable attachment adjacent (e.g., to) a particular support arm structure. For example, in one embodiment, a charm attachment member may comprise an externally threaded portion that is adapted to be matingly received into an internally threaded recess within the support arm structure. Such an arrangement allows a user to removably attach the charm attachment member to the support arm structure by placing the externally threaded portion of the charm attachment member into the support arm structure's internally threaded recess and then rotating the charm attachment member about a central axis of the externally threaded portion until the charm attachment member has been screwed into fixed attachment with the support arm structure.

Figures 11A, 11B, 11C:
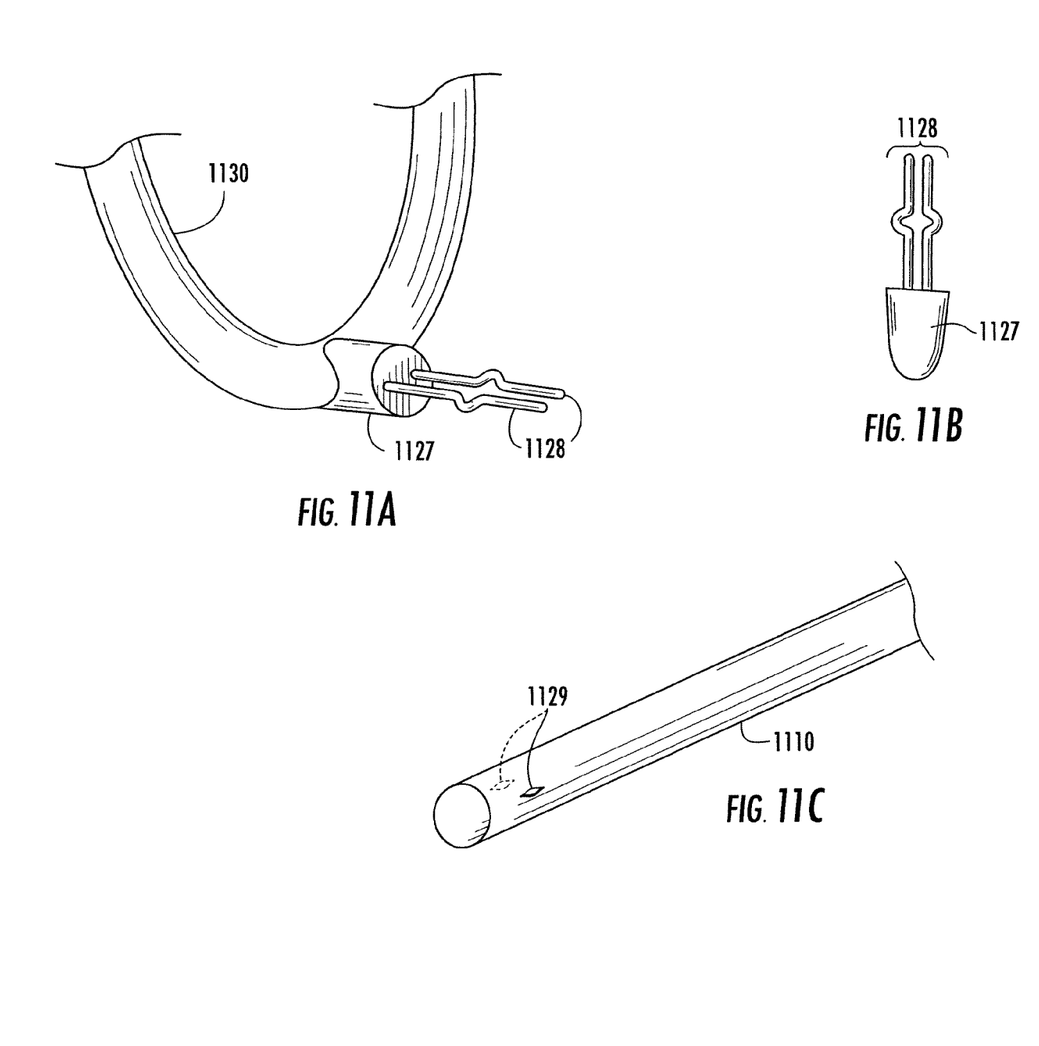
FIG. 11A is a perspective view of a charm attachment member having an elongated attachment member base with elongated attachment members extending generally outwardly from the elongated attachment member base. The elongated attachment members have protruding barbs that substantially protrude outwardly laterally.
FIG. 11B is a top view of the elongated attachment member base and the elongated attachment members of FIG. 11A.
FIG. 11C is a perspective view of a support arm structure having retaining slots for the purpose of matingly engaging the elongate attachment member's protruding barbs.

FIGS. 11A-11C illustrate another particular embodiment in which the charm attachment member is adapted for selective removable attachment adjacent a particular support arm structure. FIG. 11A illustrates a charm attachment member 1130 comprising an elongated attachment member base 1127 fixedly attached (e.g., welded or glued) at any appropriate angle to a location on the charm attachment member 1130. A plurality of elongated attachment members 1128 extend generally outwardly from the elongated attachment member base 1127. FIG. 11B is a top view of the elongated attachment members 1128, and illustrates that each elongate attachment member has a protruding barb 1126 at a defined location along the length of the elongate attachment member protruding generally laterally outwardly. FIG. 11C illustrates a support arm structure 1110 comprising an open end 1131 and a plurality of retainer slots 1129 that are adapted to matingly engage with the elongate attachment member's protruding barbs 1126. Such an arrangement allows a user to removably connect the charm attachment member 1130 to the support arm structure 1110 by inserting the elongate attachment members 1128 into the support arm open end 1131 until the elongate attachment member's protruding barbs 1126 slide into and engage the boundary portions of the retainer slots 1129. This serves to maintain the charm attachment member 1130 in a substantially fixed position adjacent (e.g., to) the support arm structure 1110.

Figure 1A:
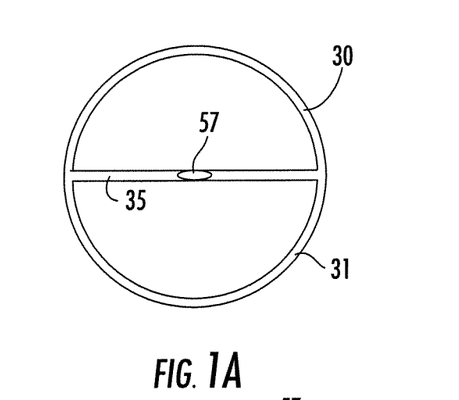
FIG. 1A is a top view of a generally circular charm attachment member according to one embodiment of the present invention.
Figure 1B:
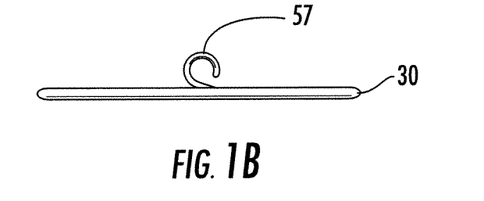
FIG. 1B is a side view of the charm attachment member of FIG. 1A.

A charm attachment member according to a particular embodiment of the invention is shown in FIGS. 1A (top view) and 1B (side view). As may be understood from these figures, in this embodiment, the charm attachment member 30 includes a substantially circular outer perimeter portion 31 and an elongate interior support bar 35 that extends along a diameter of the charm attachment member from a first interior surface of the outer perimeter portion to a second interior surface of the outer perimeter portion. The charm attachment member 30 of FIG. 1A includes a connector loop 57 (e.g., a substantially circular or hook-shaped connector loop) that is attached adjacent (e.g., to) an upper surface of the interior support bar 35 adjacent the center of the substantially circular outer perimeter portion.

Figure 1C:
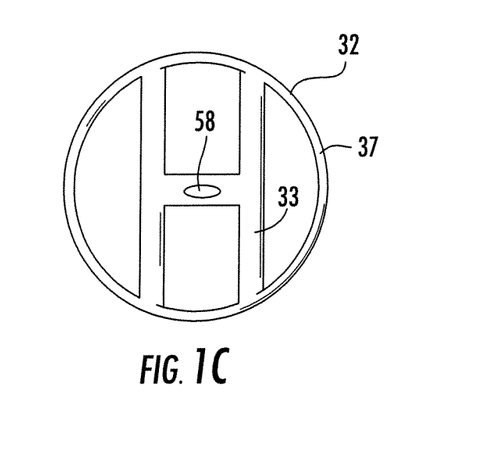
FIG. 1C is a top view of a generally circular charm attachment member according to another embodiment of the present invention.

A charm attachment member according to a further embodiment of the invention is shown in FIG. 1C (top view). As may be understood from this figure, in this embodiment, the charm attachment member 32 includes a substantially circular outer perimeter portion 37 and a substantially H-shaped interior support bar 33 that is substantially centered about a diameter of the outer perimeter portion. This substantially H-shaped interior support bar 33 extends from a first interior surface of the outer perimeter portion to a second interior surface of the outer perimeter portion. The charm attachment member 32 of FIG. 1C includes a connector loop 58 (e.g., a substantially circular or hook-shaped connector loop) that is attached adjacent (e.g., to) an upper surface of the interior support bar 58 adjacent the center of the substantially circular outer perimeter portion 37.

FIG. 2 illustrates an alternative embodiment of the charm attachment member shown in FIGS. 1A and 1B. As may be understood from FIG. 2, in this embodiment, the respective charm attachment members 130, 131 do not include a connector loop, but rather are each fixedly attached (e.g., welded or glued) to a respective distal end of the two elongate arms 110, 111 of the support arm structure 100.

FIGS. 4A-4C show various exemplary embodiments of charm attachment members. For example, as shown in FIG.

4A, a charm attachment member 220, 221 may be a substantially V-shaped element. Similarly, as shown in FIG. 4B, a charm attachment member 325, 326 may be a substantially hook-shaped member.

As shown in FIG. 4C, a particular support arm structure may include a plurality of different types of charm attachment members. For example, FIG. 4C depicts a one-arm support arm structure 400 that includes an elongate arm 410 having a substantially circular charm attachment member 430 at one of its distal ends, and a substantially hook-shaped circular charm attachment member 425 at another of its distal ends.

Figure 6A:
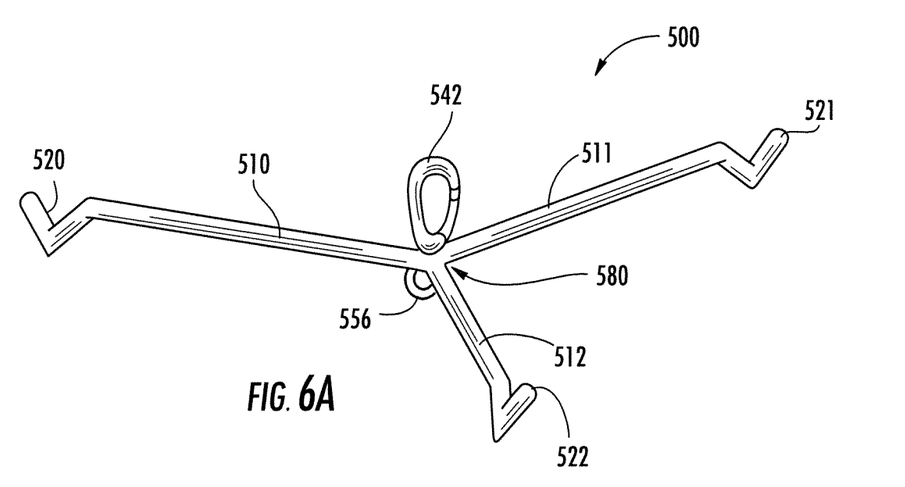
FIG. 6A is a perspective view of an embodiment of a substantially coplanar support arm structure having three elongate arms, with a substantially V-shaped charm attachment member disposed adjacent each respective distal end of the three elongate arms.
Figure 6B:
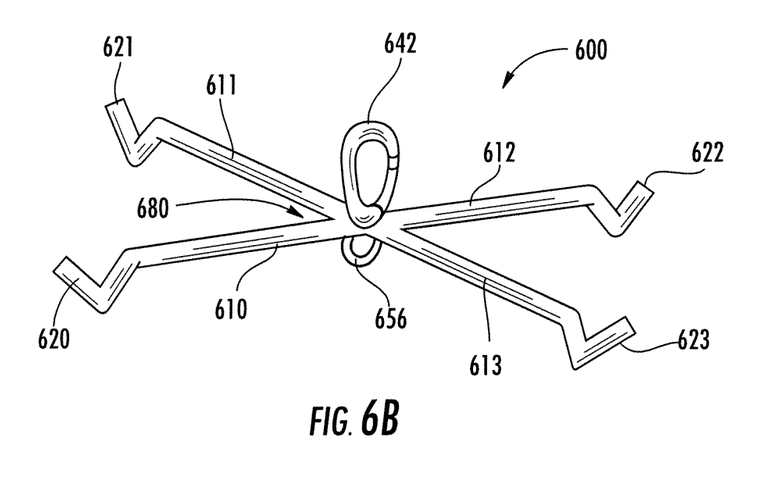
FIG. 6B is a perspective view of an embodiment of a substantially coplanar support arm structure having four elongate arms, with a substantially V-shaped charm attachment member disposed adjacent each respective distal end of the four elongate arms.

FIG. 6A illustrates a support arm structure 500 having three elongate arms 510, 511, 512 and three substantially V-shaped charm attachment members 520, 521, 522 that are each respectively positioned at a distal end of one of the three elongate arms 510, 511, 512. Similarly, FIG. 6B illustrates a support arm structure 600 having four elongate arms 610, 611, 612, 613 and four substantially V-shaped charm attachment members 620, 621, 622, 623 that are each respectively positioned at a distal end of one of the four elongate arms 610, 611, 612, 613.

In particular embodiments, any of the substantially V-shaped charm attachment members described with reference to FIGS. 4A, 6A, and 6B may be formed as part of the elongate arms or support arm structures on which they are positioned. Alternatively, the substantially V-shaped charm attachment members may be formed separately and later affixed to the ends of the elongate arms or support arm structures described above. Furthermore, in particular embodiments, any of the substantially hook-shaped charm attachment members described with reference to FIG. 4B may be formed as part of the elongate arms or support arm structures on which they are positioned. Alternatively, the substantially hook-shaped charm attachment members may be formed separately and later affixed to the ends of the elongate arms or support arm structures described above.

As another example (not shown), the three-arm support arm structure of FIG. 6A could be configured to have a substantially V-shaped charm attachment member at the end of its first elongate arm 510, a generally circular charm attachment member positioned at the end of its second elongate arm 511, and a substantially hook-shaped charm attachment member positioned at the end of its third elongate arm 512. Alternatively, the three charm attachment members positioned at the end of the three elongate arms 510, 511, 512 could be substantially hook-shaped charm attachment members (or any other appropriate type of charm attachment member).

Charms

As noted above, a mobile according to various embodiments of the invention comprises one or more "charms" that are adapted to provide a desired visual effect, such as a coordinated visual effect. In particular embodiments, the mobile comprises a plurality of charms that cooperate to provide a coordinated visual effect. For example, in one embodiment, each of a plurality of charms (e.g., 2, 3, 4, 5, or 6 charms) includes a particular respective portion of a particular advertisement.

In one example, a mobile may include first, second, and third charms. In this embodiment, the first charm may include a first portion of a particular advertisement, the second charm may include a second portion of the particular advertisement, and the third charm may include a third portion of the particular advertisement. In this example, the first, second, and third portions may combine to form a particular advertisement, e.g. to form a particular word, phrase, sentence, or picture and to thereby convey a particular visual or written advertising message.

Charms according to various embodiments of the invention are adapted for removable attachment adjacent a particular charm attachment member. In particular embodiments, the outer boundaries of a particular charm are in substantially the same shape as the outer boundaries of a particular charm attachment member to which the particular charm is attached (or adapted to be attached). For example, in a particular embodiment, a charm is shaped substantially similarly to the generally circular charm attachment member 30 shown in FIG. 1A. In this embodiment, the charm has a substantially circular outer perimeter, and may have an elongate attachment member extending along a diameter of the charm's outer perimeter from a first portion of the charm's outer perimeter to a second portion of the charm's outer perimeter. The charm may further include a retainer clip of any appropriate size and shape (or any other appropriate attachment mechanism) that is adapted for removably attaching the charm adjacent the charm attachment member.

Charms according to further embodiments of the invention may be adapted so that the outer boundaries of a particular charm extend beyond the outer boundaries of a particular charm attachment member to which the particular charm is attached (or adapted to be attached).

One particular type of charm is a character display charm. In various embodiments, these charms include a display surface, and one or more characters displayed on the display surface. Character display charms according to particular embodiments of the invention include only one character prominently displayed (e.g., displayed so that it can be seen clearly from a distance) on the charm's display surface.

Figure 8A:
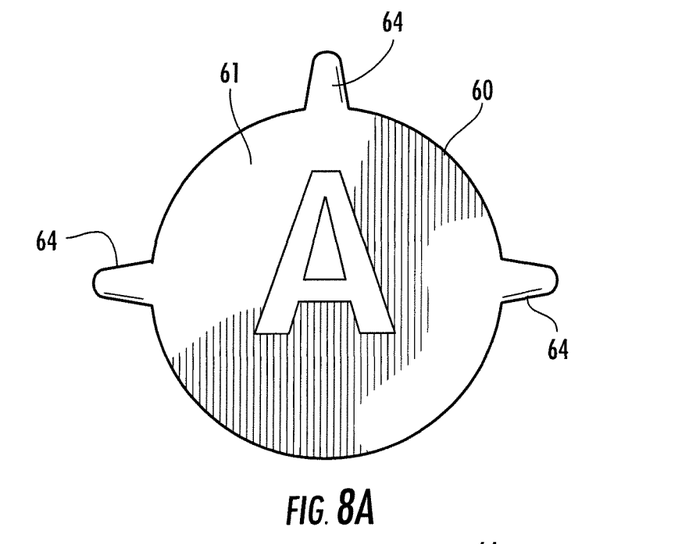
FIG. 8A is a front view of a character display charm according to one embodiment of the present invention.
Figure 8B:
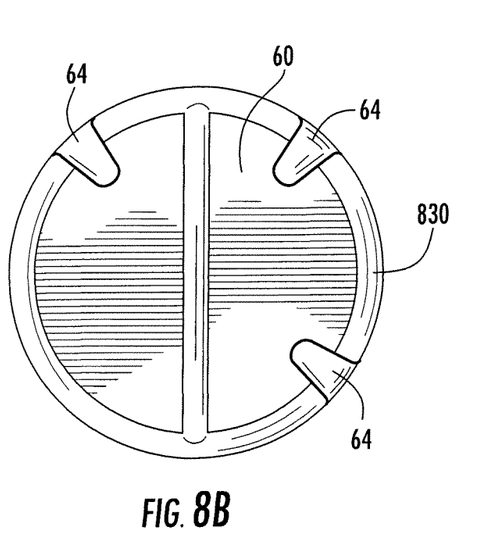
FIG. 8B is a rear view of the character display charm of FIG. 8A, in which the character display charm is shown attached to a charm attachment member.
Figure 8C:
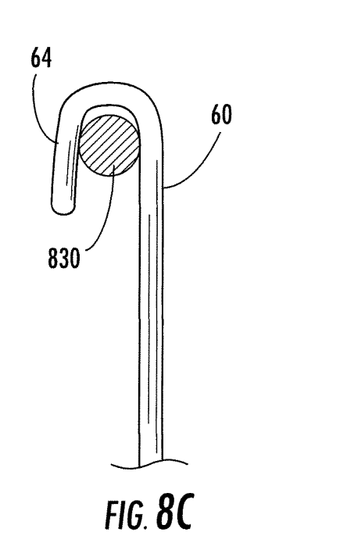
FIG. 8C is a side, cross-sectional view of an attachment tab of the character display charm assembly of FIG. 8B. This figure shows that the attachment tab is folded over a portion of the outer perimeter of the charm attachment member for the purpose of attaching the character display charm to the charm attachment member.

FIG. 8A illustrates one embodiment of a character display charm 60. In this embodiment, the character display charm 60 includes a display portion 61 that is adapted for display to a user when the character display charm 60 is installed in place adjacent a charm attachment member. The display charm 60 further includes a plurality of laterally outwardly extending attachment tabs 64, each of which is disposed adjacent an outer perimeter of the character display charm 60. Each of these attachment tabs 64 is adapted to be folded over a portion of a corresponding charm attachment member 830. In particular embodiments, when the tabs 64 are folded over the corresponding charm attachment member 830 (e.g., as shown in FIGS. 8B and 8C), the tabs 64 cooperate to hold the character display charm 60 in place adjacent the charm attachment member 830.

Hanger Assembly

Mobiles according to various embodiments of the invention include one or more hanger assemblies that are adapted for attaching the mobile (and/or various individual components of the mobile) to a mobile support (e.g., a support cord) or to other components of the mobile. In particular embodiments, one or more of the hanger assemblies are adapted to facilitate this attachment in a manner that allows a first component to which the hanger assembly is attached to rotate (e.g., in a substantially horizontal plane) relative to a second component to which the hanger assembly is attached. In this regard, the hanger assembly may consist of (or comprise) for example, a hook, loop or swivel.

In various embodiments, a particular hanger assembly may be physically integrated into a particular support arm structure. As discussed in greater detail below, in other embodiments, one or more hanger assemblies may be physically separate from one or more support arm structures to which they are adapted to be attached.

In particular embodiments, at least one of the hanger assemblies is adapted to be selectively attached at any of a plurality of different positions along a length of a particular one of the mobile's support arm structures. This may, for example, facilitate changing the position of a fulcrum about which the particular support arm structure is supported, which may allow the support arm structure to support charms of varying weights and sizes and to, for example, remain in a substantially horizontal orientation while doing so. In particular embodiments, a hanger assembly is adapted to slide relative to a portion of a particular support arm structure (e.g., while still attached adjacent (e.g., to) a portion of the support arm structure) and to thereby change the position of a fulcrum about which the particular support arm structure is supported.

Figure 5A:
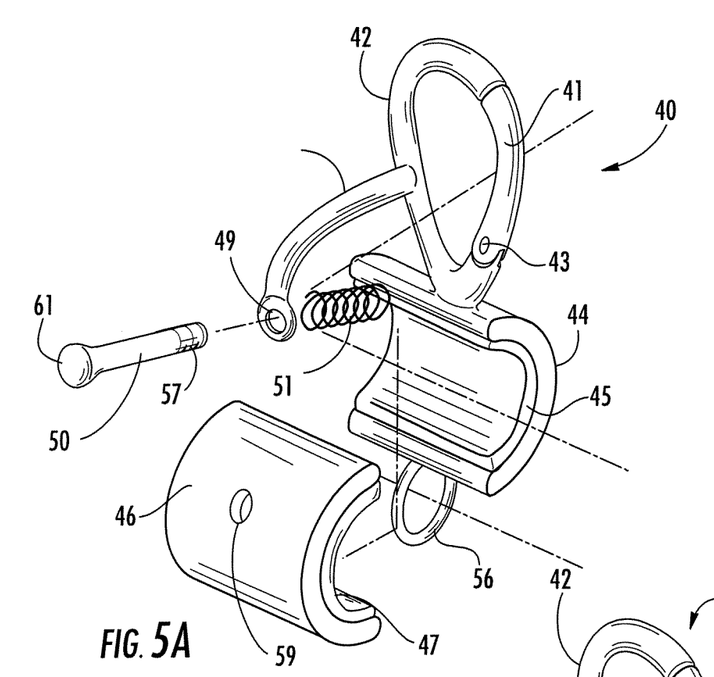
FIG. 5A is an exploded perspective view of a hanger assembly according to one embodiment of the present invention.
Figure 5B:
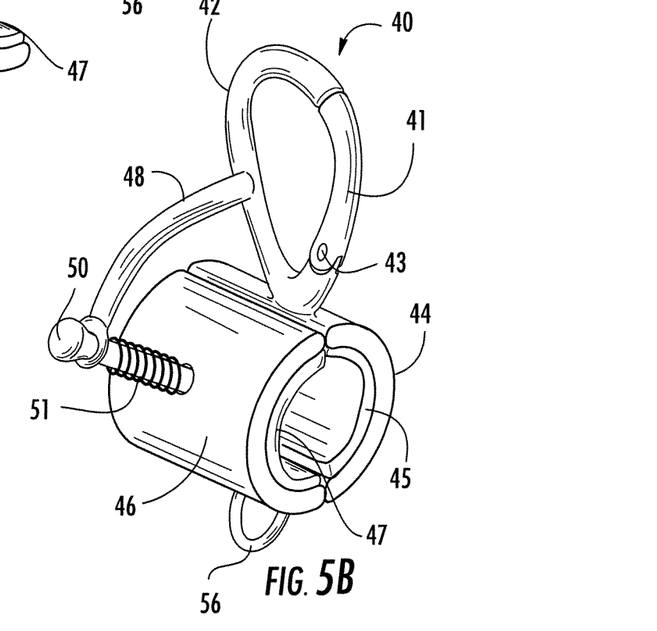
FIG. 5B is a perspective view of the hanger assembly of FIG. 5A in which the hanger assembly is shown assembled.

FIGS. 5A and 5B illustrate a hanger assembly 40 according to one embodiment of the present invention. FIG. 5A illustrates an exploded view of a hanger assembly 40 having a hanger clip 42, a first attachment portion 44, a first movement inhibitor portion 45, a second attachment portion 46, a second movement inhibitor portion 47, a retaining bar 48, an expansion control member 50, and a compression spring 51. The hanger assembly 40 shown in FIGS. 5A-5B also includes a connector 56, which is discussed further below. However, in various other embodiments, the hanger assembly 40 may not include a connector 56.

In particular embodiments, the hanger clip 42 is substantially in the form of a closed loop, and has a hinged portion 41 which pivots about a spring-loaded hinge 43 to selectively open and close the loop. In particular embodiments, the spring-loaded hinge 43 is biased to maintain the hanger clip 42 in the form of a closed loop.

In various embodiments, the hanger's first and second attachment portions 44, 46 each have a substantially C-shaped cross-section and are adapted to cooperate to form an attachment assembly having a substantially circular cross section when the first and second attachment portions 44, 46 are in a co-facing arrangement. Similarly, in particular embodiments, the first and second movement inhibitor portions 45, 47 each have a substantially C-shaped cross-section and are adapted to cooperate to form a movement inhibitor assembly having a substantially circular cross section. In particular embodiments, the first movement inhibitor portion 45 is adapted to substantially conform to a concave surface of the first attachment portion 44. Similarly, in various embodiments, the second movement inhibitor portion 47 is adapted to substantially conform to a concave surface of the second attachment portion 46.

In the embodiment shown in FIGS. 5A and 5B, the hanger clip 42 extends upwardly from an upper surface of the first attachment portion 44 and is positioned so that a plane in which the hanger clip 42 is positioned is parallel to the major axis of the attachment assembly (which, as noted above, includes the first and second attachment portions 44, 46). In a particular embodiment, the retaining bar 48 is attached to the hanger clip 42 and extends laterally outwardly from the hanger clip 42. In a particular embodiment, the retaining bar 48 includes an opening 49 that is adapted to receive an elongate fastening portion of the expansion control member 50.

To assemble the hanger assembly 40, a user first inserts the expansion control member 50 through the opening 49 in the retaining bar 48 as shown in FIGS. 5A and 5B, and then threads a spring 51 onto the elongate fastening portion of the expansion control member 50. The user then inserts a threaded distal end 57 of the elongate fastening portion into a threaded opening 59 in the outer surface of the second attachment portion 46 and rotates the expansion control member 50 until the second attachment portion 46 is attached to the distal end of the elongate fastening portion. In this configuration, a head portion 61 of the expansion control member 50 prevents the expansion control member from passing entirely through the opening 49 in the retaining bar 48. Also, when this embodiment of the hanger assembly is in this assembled configuration, a user may exert an outward force on the head portion 61 of the expansion control member 50, which causes the second attachment portion 46 to move laterally away from the first attachment portion 44 and to thereby increase the space between the first and second attachment portions 44, 46. This may allow a user to slide the hanger assembly relative to a portion of a support arm structure (e.g., from a first position adjacent the support arm structure to a second position adjacent the support arm structure). The user may then re-secure the hanger assembly in the second position adjacent the support arm structure by releasing the expansion control member 50. Once this is done, the compression spring 51 urges the second retaining portion 46 toward the first retaining portion 44, and thereby holds the hanger assembly in the second position adjacent the support arm structure.

In one embodiment of the present invention, the first movement inhibitor portion 45 and the second movement inhibitor portion 47 cooperate to substantially inhibit the lateral and/or axial movement of the hanger assembly 40 relative to a support arm structure to which the hanger assembly 40 is attached. The first movement inhibitor portion 45 and second movement inhibitor portion 47 are preferably made of a compressible, relatively high-friction substance, such as rubber. In particular alternative embodiments, the hanger assembly 40 may, for example, not include one or more of the first and/or second movement inhibitor portions 45, 47.

As shown in FIG. 5A, the hanger clip 42 and connector 56 may be attached to the first retaining portion 44 in such a way as to define perpendicular planes. In such embodiments, the plane defined by the hanger clip 42 (represented by Axis A) is substantially perpendicular to the plane defined by the connector 56 (represented by Axis B). In the particular embodiment shown in FIG. 5A, Axis B is substantially parallel to the axis defined by the center line of the first retaining portion 44 (represented by Axis C). In various other embodiments (not shown), the planes defined by the hanger clip 42 and connector 56 may be substantially parallel to each other, or may define any other appropriate angle.

Materials

It should be understood that the mobile's various components (e.g., the components discussed above) may be made of any suitable material. Such materials may include, for example, aluminum, steel, plastic, wood, or any other suitable material.

Exemplary Mobile with Character Display Charms

In an embodiment shown in FIG. 7A, a mobile 700 is provided which includes a plurality of charm attachment members 734 (e.g., substantially circular charm attachment members) disposed in a substantially circular, substantially horizontal array. In this embodiment, each of the charm attachment members 734 is positioned so that it lies in a substantially vertical plane that extends through a center of the substantially circular array. In various embodiments, the charm attachment members are spaced substantially uniformly apart within the array.

In particular embodiments, each of the charm attachment members 734 is attached to a central (e.g., substantially circular) charm attachment member support 730. This charm attachment member support 730 may include an upwardly extending support rod 759 and a substantially circular hanger assembly 758 (e.g., disposed adjacent an upper end of the support rod 759). The support rod 759 and hanger assembly 758 may be used to support the mobile 700 in a manner known in the art.

As may be understood from FIGS. 7A and 7B, the mobile 700 may include a plurality of character display charms 760, each of which is attached adjacent a particular respective one of the charm attachment members 734. In the embodiment shown in FIG. 7B, the outer perimeter of each character display charm 760 substantially corresponds to the size and shape of the outer perimeter of the charm attachment member 734 to which the character display charm 760 is attached. Accordingly, in this embodiment, the mobile 700 includes a plurality of character display charms 760 (e.g., substantially circular character display charms 760) disposed in a substantially circular, substantially horizontal array. In this embodiment, each of the character display charms 760 is positioned so that it lies in a substantially vertical plane that extends through a center of the substantially circular array. In various embodiments, the character display charms 760 are spaced substantially uniformly apart within said array.

In other embodiments, the arrays of charm attachment members and/or charms may be in the form of shapes other than circles. For example, in particular embodiments, the arrays of charm attachment members and/or charms may be substantially in the form of squares, triangles, hexagons, or any other suitable shape. Additionally, the charm attachment members may be disposed in any appropriate orientation relative to the charm attachment member support 730.

Exemplary Mobile

FIG. 10 shows a somewhat structurally complex mobile according to a particular embodiment of the invention. In this embodiment, the mobile 1000 includes a first support arm structure 1300, a second support arm structure 1100, a third support arm structure 1400, a fourth support arm structure 1800, a fifth support arm structure 1200, a sixth support arm structure 1500, a seventh support arm structure 1600, and an eighth support arm structure 1900.

As may be understood from FIG. 10, the mobile 1000 further includes a first hanger assembly 1040 that is adapted to be selectively positioned along the length of the first support arm structure 1300, which is a single-arm support arm structure. The mobile 1000 is shown suspended from a support cord 1001 that extends between a ceiling 1002 and the first hanger assembly 1040. The first support arm structure 1300 includes two hook-shaped charm attachment members 1325, 1326, each of which is disposed at a respective distal end of an elongate arm 1310 of the first support arm structure 1300.

The second support arm structure 1100 is a two-armed support arm structure having an integrated hanger assembly 1142 disposed adjacent an upper surface of its central hub portion, and an integrated connector loop 1156 disposed adjacent a lower surface of its central hub portion. The second support arm structure 1100 is shown hanging from the first support arm structure's first hook-shaped charm attachment member 1326. An elongate connector rod 1901 extends between the second support arm structure's connector loop 1156, and the hanger 1942 of the eighth support arm structure 1900, which is a four-armed support arm structure.

The third support arm structure 1400 includes a second hanger assembly 1426 that is adapted to be selectively positioned along the length of the third support arm structure 1400, which is a single-arm support arm structure. Similarly, the fourth support arm structure 1800 includes a third hanger assembly 1826 that is adapted to be selectively positioned along the length of the fourth support arm structure 1800, which is a single-arm support arm structure. By the same token, the fifth support arm structure 1200 includes a fourth hanger assembly 1226 that is adapted to be selectively positioned along the length of the fifth support arm structure 1200, which is also a single-arm support arm structure.

As shown in FIG. 10, the third support arm structure 1400 is suspended from one end of the first support arm structure 1300 by the second hanger assembly 1426. Similarly, the fourth support arm structure 1800 is suspended from one end of the third support arm structure 1400 by the third hanger assembly 1826. By the same token, the fifth support arm structure 1200 is suspended from one end of the fourth support arm structure 1800 by the fourth hanger assembly 1226. The sixth support arm structure 1600, which is a four-arm support arm structure, is suspended from a first distal end of the fifth support arm structure 1200. Similarly, the seventh support arm structure 1500, which is a three-arm support arm structure, is suspended from a second distal end of the fifth support arm structure 1200. One or more charm attachment members may be rotatably (or non-rotatably) attached adjacent the various distal ends of the sixth and/or seventh support arm structures.

Assembly of an Exemplary Mobile and Mobile Kit

As will be understood in view of the above disclosure, it should be understood that various combinations of the above components may be used to assemble an extensive variety of modular mobiles. As shown in FIG. 10, this may be accomplished by attaching various support arm structures to each other via, for example, hangers, connectors, connector rods and/or suitable attachment mechanisms. Sliding hanger assemblies, such as the first hanger assembly 1040 shown in FIG. 10 may be used, for example, to provide a particular support arm structure with an adjustable fulcrum. To do this, an assembled hanger assembly 40 (see FIGS. 5A and 5B) may be placed onto a support arm structure's elongate arm by urging the second attachment portion 46 toward the retaining bar 48, while moving an elongate arm of the support arm structure adjacent an interior concave portion the hanger assembly's first attachment portion 44. Once the elongate arm is in this position, the second attachment portion 46 can be released, and in various embodiments, the spring 51 will retain the elongate arm snugly in place between the first attachment portion 44 and the second attachment portion 46.

When the hanger assembly 40 is installed adjacent the elongate arm, the first movement inhibitor portion 45 and second movement inhibitor portion 47 cooperate to substantially inhibit the lateral and/or axial movement of the hanger assembly 40 along the elongate arm. However, by moving the second attachment portion 46 toward the retaining bar 48 (e.g., by pulling the head portion 61 of the expansion control member 50 away from the retaining bar 48), the elongate arm can be sufficiently released to allow the hanger assembly 40 to slide and be laterally repositioned along the length of the elongate arm. In various embodiments, the hanger assembly 40 thus can be positioned at any selected position along the length of the elongate arm.

In particular embodiments, the hanger assembly 40 defines a fulcrum about which the elongate arm (and, consequently, the corresponding support arm structure) pivots and/or rotates. In one embodiment, the hanger assembly 40 may be placed at a particular position along the length of the elongate arm that is selected so that the fulcrum defined by the hanger assembly 40 allows the support arm structure to remain substantially horizontal and balanced when supported by the hanger assembly 40.

In particular embodiments, a telescoping elongate arm of a support arm structure may be selectively extended or retracted in order to allow the support arm structure to remain substantially horizontal and balanced when supported by a hanger assembly 40, as depicted in FIG. 5B, or when supported by any other means, such as an integrated hanger assembly 1142 as shown in FIG. 10.

In particular embodiments, charms may be attached adjacent (e.g., to) the mobile in any appropriate manner. For example, one or more charms may be attached to a corresponding charm attachment member via any appropriate attachment mechanism (e.g., via structural tabs, Velcro fasteners, male/female threaded arrangements, clips, adhesive substances, or any other appropriate attachment mechanism).

In particular embodiments, characters can be displayed on the character display charms in any appropriate manner. For example, characters may be printed directly onto a character display charm, or characters may be attached adjacent (e.g., to) a corresponding character display charm via any appropriate attachment mechanism (e.g., via magnetism, Velcro fasteners, adhesive substances, or any other appropriate attachment mechanism).

Various Exemplary Uses of Selected Mobiles

Mobiles according to various embodiments of the invention may be adapted to convey a message, such as an advertising message. For example, the mobile 700 of FIGS. 7A and 7B is adapted to display a message alerting customers to visit a particular website. This message is conveyed via a plurality of character display charms 760 that are each attached adjacent a respective one of the charm attachment members 734.

In the embodiment shown in FIG. 7B, several of the character display charms only have a single character prominently displayed on their respective display surfaces. Accordingly, displaying these character display charms in an array (such as the array shown in FIG. 7B) results in a word (or other alphanumeric message) being spelled out by the array of character display charms. Various other character display charms have multiple characters displayed on them (such as "Visit" and "www"), and may be used to further enhance the overall alphanumeric message displayed by the mobile.

As discussed above, mobiles according to various embodiments of the invention may include charms 760 that are adapted to be removably attached adjacent the mobile's various charm attachment members 734. Accordingly, a particular mobile kit may include one or more different sets of charms (e.g., one or more different sets of character display charms), and each of the sets of charms may be adapted to display a distinct advertising message. For example, a mobile kit may include both a first set of charms that is adapted to convey a first advertising message (e.g., "Tomatoes $3.00/lb"), and a second set of charms that that is adapted to convey a second advertising message (e.g., "Potatoes $0.75/lb"). This may allow a single mobile charm support structure (e.g., the mobile charm support structure of FIG. 7A) to convey any of a variety of different advertising messages. In various embodiments, in order to change the advertising message of a particular mobile, the mobile's current set of charms would simply need to be replaced with a suitable second (or third) set of charms.

In certain embodiments, the relative weights of the charms within a first set of charms are different than the relative weights of the charms within a second set of charms. In many cases, it may be desirable to maintain the support arm structures in a substantially horizontal arrangement. In order to accomplish this, in particular embodiments, a user may modify the lateral position of one or more of the mobile's hangers, or the user may extend or retract a telescoping arm of a support arm structure, thereby modifying the fulcrum of one of more of the support arm structures in order to achieve the desired mobile configuration.

While the character display charms illustrated in FIG. 7B generally display alphanumeric characters, other symbols or images can be printed or otherwise displayed on various character display charms. For instance, the mobile kit 900 of FIG. 9 includes a character display charm 960 which shows an image of a man, and an additional character display charm which shows an image of a woman. As an example, such a mobile kit 900 could thus be used to designate the locations of restrooms at a particular location.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A mobile kit comprising:
    a support arm structure comprising:
        a hub portion; and
        a plurality of elongate arms extending outwardly and downwardly from aid hub portion;
    a hanger assembly adapted to be selectively connected adjacent said support arm structure at any one of a plurality of positions along a length of said support arm structure so that said particular position defines a fulcrum about which said support arm structure may rotate; and
    a plurality of charm attachment members, wherein:
        a particular one of said plurality of charm attachment members is positioned adjacent a distal end of a respective particular one of said plurality of elongate arms; and
    at least one of said at least one charm attachment member comprises:
        a substantially circular outer perimeter portion; and
        an interior support bar that extends about a diameter of said outer perimeter portion, wherein said interior support bar extends from a first interior surface of said outer perimeter portion to a second interior surface of said outer perimeter portion.

2. The mobile kit of claim 1, further comprising at least one charm adapted for selective attachment to said charm attachment member, wherein said charm comprises:
    a substantially circular display surface; and
    a plurality of laterally outwardly extending attachment tabs disposed adjacent an outer perimeter of said display surface, wherein said plurality of attachment tabs are adapted to be folded over an adjacent portion of said charm attachment member and, when said plurality of attachment tabs are folded over said adjacent portion of said charm attachment member, said plurality of attachment tabs cooperate to hold said charm in place adjacent said charm attachment member.

3. A mobile comprising:
    a substantially circular central charm attachment member support;
    a plurality of charm attachment members disposed in a substantially circular, substantially horizontal array on said central charm attachment member support, wherein said plurality of charm attachment members are positioned so that each particular one of said plurality of charm attachment members lies in a substantially vertical plane that extends through a center of said substantially circular array; and a plurality of character display charms, each of which is attached adjacent a particular respective one of said charm attachment members, wherein:

each of said character display charms includes at least one character and, when said plurality of character display charms is attached adjacent a particular respective one of said charm attachment members, respective characters from each of said plurality of character display charms combine in sequence within said array to form at least one word.

* * * * *